(12) United States Patent
Paschalakis

(10) Patent No.: US 7,444,022 B2
(45) Date of Patent: Oct. 28, 2008

(54) METHOD AND APPARATUS FOR SEPARATING CONTENT TYPES IN IMAGES

(75) Inventor: Stavros Paschalakis, Guildford (GB)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 826 days.

(21) Appl. No.: 11/002,264

(22) Filed: Dec. 3, 2004

(65) Prior Publication Data

US 2005/0175227 A1    Aug. 11, 2005

(30) Foreign Application Priority Data

Dec. 9, 2003    (EP)    ................................. 03257736

(51) Int. Cl.
G06K 9/62  (2006.01)
G06K 9/00  (2006.01)
G06K 9/36  (2006.01)

(52) U.S. Cl. ....................... 382/224; 382/168

(58) Field of Classification Search ............... 382/117, 382/118, 162, 164, 167, 168, 172, 173, 218, 382/219, 224, 232, 233, 254, 260–264, 284; 358/515, 518, 520, 530; 345/589, 600–604

See application file for complete search history.

(56) References Cited

U.S. PATENT DOCUMENTS

| | | | |
|---|---|---|---|
| 6,141,434 A | | 10/2000 | Christian et al. |
| 6,754,389 B1* | | 6/2004 | Dimitrova et al. ............ 382/224 |
| 6,788,818 B1* | | 9/2004 | Krumm et al. ............... 382/209 |
| 6,993,180 B2* | | 1/2006 | Sun et al. ..................... 382/165 |
| 7,035,467 B2* | | 4/2006 | Nicponski .................... 382/224 |
| 7,076,095 B2* | | 7/2006 | Kim et al. .................... 382/164 |
| 7,162,073 B1* | | 1/2007 | Akgul et al. ................. 382/149 |
| 7,171,042 B2* | | 1/2007 | Hartmann et al. ........... 382/159 |
| 7,218,792 B2* | | 5/2007 | Raskar et al. ................ 382/254 |
| 7,239,746 B1* | | 7/2007 | Sinclair et al. .............. 382/173 |
| 7,245,767 B2* | | 7/2007 | Moreno et al. .............. 382/224 |
| 7,280,697 B2* | | 10/2007 | Perona et al. ................ 382/225 |

(Continued)

FOREIGN PATENT DOCUMENTS

EP    1 211 638 A2    6/2002

(Continued)

OTHER PUBLICATIONS

In Proceedings of European Conference on Computer Vision ECCV'96, 1996, vol. 2, pp. 593-602, "Finding Naked People," Fleck et al.

(Continued)

Primary Examiner—Amir Alavi
(74) Attorney, Agent, or Firm—Birch, Stewart, Kolasch & Birch, LLP

(57) ABSTRACT

A method of classifying pixels in an image comprises combining (a) a method of identifying pixels of a first content type, wherein said method may also falsely identify pixels of a second content type as belonging to said first content type, with (b) a method of distinguishing between pixels of types including said first content type and pixels of types including said second content type, wherein method (b) comprises (c) a method for distinguishing between said first content type and content including said second content type and/or (d) a method for distinguishing between said second content type and content including said first content type.

38 Claims, 9 Drawing Sheets

U.S. PATENT DOCUMENTS 7,327,891 B2 * 2/2008 Covell et al. ............... 382/224

FOREIGN PATENT DOCUMENTS

| EP | 1 223 550 A2 | 7/2002 |
| EP | 1 353 516 A1 | 10/2003 |

OTHER PUBLICATIONS

Pattern Recognition Letters, vol. 20, No. 10, pp. 967-978, Oct. 1999, "A Fast Algorithm for Tracking Human Faces Based on Chromatic Histograms," Yoo et al.

In Proceedings of Third IEEE Workshop on Application of Computer Vision, 1996, pp. 142-147, "A Real-Time Face Tracker," Yang et al.

In Proceedings of 15th International Conference on Pattern Recognition ICPR 2000, vol. 1, pp. 1839-1842, 2000, "Skin Detection in Video Under Changing Illumination Conditions," Soriano et al.

In Proceedings of IEEE International Conference on Image Processing ICIP'96, 1996, pp. 483-486, "Face Localization and Facial Feature Extraction Based on Shape and Color Information," Sobottka et al.

In Proceedings of IEEE International Conference on Computer Vision and Pattern Recognition CVPR'99, Jun. 1999, pp. 274-280, "Statistical Color Models with Application to Skin Detection," Jones et al.

CISST '00 International Conference, XP008017757, 2000, pp. 117-122, "Locating Human Face in a Complex Background Including Non-Face Skin Colors," Tang et al.

1999 IEEE, pp. 58-63, "Comparison of Five Color Models in Skin Pixel Classification," Zarit et al.

2000 IEEE, XP-000988007, pp. II-421-II-424, "A Bayesian Approach to Skin Color Classification in YCBCR Color Space," Chai et al.

\* cited by examiner (a)

(b)

(c)

(a)

(b)

(c)

(a)

(b) (c)

(a)

(b)

(c)

(a)

(b)

(c)

(a)

(b)

(c)

METHOD AND APPARATUS FOR SEPARATING CONTENT TYPES IN IMAGES

The invention relates to a method and apparatus for detecting regions in an image of a specific content type, such as skin, especially using colour. The invention relates especially to distinguishing regions in an image of a first content type from regions of a second content type, where the first and second content types are similar or indistinguishable under certain conditions such as in certain colour spaces or when using certain methods. The invention is especially concerned with detecting skin, and distinguishing skin from other regions such as hair which are perceptually similar under currently known skin detection systems.

In this specification, the term content type is used to mean a feature of an image such as skin, hair, etc which is represented or identifiable by a characteristic image feature or distribution in a relevant feature space. For example, a content type such as skin may be represented by a colour distribution in a certain colour space. Content type also includes groups of content types, for example, groups having a similar distribution or included in a larger distribution. The term image includes a still image or an image forming part of a sequence of images such as a video sequence, and includes a frame or field of an interlaced image, and the term image may be also used to mean a region of image. A region of an image includes a pixel or a group of pixels, and the group of pixels may be arranged in any kind of shape, and may be either spatially connected or unconnected. The above interpretations apply unless it is stated otherwise or apparent from the context.

Automatic human skin detection is a method commonly used in various image and video processing application areas, the two most prominent being image categorization, e.g. detection of pornographic images, and face detection and tracking, which is useful, for example, in mobile phones or surveillance systems. Examples of known techniques are described in EP-A-1 353 516, Fleck, M., Forsyth, D., Bregler, C., "Finding naked people", *In Proceedings of European conference on Computer Vision ECCV'96*, 1996, vol. 2, pp. 593-602, Yoo, T. W., Oh, I. S., "A Fast Algorithm for Tracking Human Faces Based on Chromatic Histograms", *Pattern Recognition Letters*, vol. 20, no. 10, pp. 967-978, October 1999, Yang, J., Waibel, A., "A Real-Time Face Tracker", *In Proceedings of Third IEEE Workshop on Applications of Computer Vision*, pp. 142-147, 1996.

The problem of automatic human skin detection in digital images and video has been investigated by various researchers. In addition to the examples given above, other examples include Soriano, M., Martinkauppi, B., Huovinen, S., Laaksonen, M., "Skin Detection in Video Under Changing Illumination Conditions", *In Proceedings of 15th International Conference on Pattern Recognition ICPR* 2000, vol. 1, pp. 1839-1842, 2000, Sobottka, K., Pitas, I., "Face Localization and Facial Feature Extraction Based on Shape and Color Information", *In Proceedings of IEEE International Conference on Image Processing ICIP'96*, pp. 483-486, 1996, Jones, M. J., Rehg, J. M., "Statistical Color Models with Application to Skin Detection", *In Proceedings of IEEE International Conference on Computer Vision and Pattern Recognition CVPR'99*, pp. 274-280, June 1999. Despite differences in the reported solutions, researchers agree that the most powerful cue for skin detection is colour. The differences in the reported methods lie in aspects such as the choice of the colour representation system (e.g. RGB, HSL, $YC_bC_r$, etc.), the information utilised for detection (e.g. 3D full colour, 2D chrominance, etc.), the type of the skin colour model employed (e.g. histogram, Gaussian or mixture of Gaussians, simple heuristic colour value rules, etc.) and so on. In general, however, colour-based skin detection involves possibly transforming each pixel in an image to a new colour space, utilising some or all of its colour information in conjunction with a skin colour model to obtain a skin colour probability, and based on this probability deciding whether the pixel in question should be classified as skin or not. Regardless of the type of model (e.g. Gaussian or histogram), chrominance-based skin colour models (e.g. based on normalized rg, HS of HSL, $C_bC_r$ of $YC_bC_r$, etc.) are preferable to full colour models (e.g. full RGB) and dominate the literature. This is because of the illumination intensity robustness properties of chrominance-based models, as well as the fact that the skin colour of different people and of different ethnicities (e.g. African, Caucasian, Asian, etc.) differs mainly with respect to intensity rather than the chromatic information itself.

A common problem with colour-based skin detection, especially chrominance-based, is that non-skin pixels are commonly detected as skin, since the colour of skin is not actually exclusive to skin. Because non-skin pixels which are detected as skin will, by and large, be detected with a lower probability, the use of a skin colour probability threshold can alleviate this problem to an extent. Even if falsely detected non-skin regions are not completely eliminated, they usually become fragmented to an extent that subsequent connected component analysis and small region elimination algorithms can eliminate them, while spatial filtering methods can recapture valid skin pixels which were falsely eliminated as a result of the thresholding process. There is, however, a non-skin material which is usually detected with a high skin colour probability, because it has near-identical chrominance to skin, and which can rarely be eliminated by spatial processing because it is connected to skin. This material is hair. This type of false detection can greatly affect the overall performance of an image or video processing application. In face detection and tracking, for example, it can severely affect the correct computation of the face window. In image classification, it can result in significant classification errors. In an application where the aim is accurate skin detection and subsequent tone modification, e.g. in special effects, it can also be detrimental.

The problem of false hair detection during automatic skin detection has not been extensively investigated or adequately solved to date. Fleck et al. mentioned above propose a general enhancement towards reinforcing the performance, i.e. reducing the false acceptance rate (non-skin pixels detected as skin), of a chrominance-based skin detection model. This enhancement is the use of texture strength information on the basis that skin is relatively uniform. There, texture strength is defined as the difference between an original intensity image and its median-filtered version. One problem with the method proposed by Fleck et al. is that the computation and processing of the texture image is computationally expensive compared to the pixel-based processing that the colour-based skin detection process involves. Another problem is that the texture strength of a skin region in some local neighborhood will vary as the spatial resolution and noise level of the image varies. A further problem with this approach is that valid skin pixels which appear on the edge of skin regions may be very easily eliminated as non-skin pixels.

Jones and Rehg mentioned above also propose a method for generally improving the performance of colour-based skin detection. There, a statistical skin colour model is used in conjunction with a statistical non-skin colour model. The difficulty with this approach is that the creation of a model which describes non-skin is extremely difficult in terms of gathering the relevant data. Even if one succeeds in creating a correct statistical non-skin colour model, such a model would be too general to provide an optimal solution to the specific skin/hair confusion problem.

In EP-A-1 211 638 and EP-A-1 223 550, Chen and Ray address the problem of false hair detection during automatic skin detection directly. More specifically, the inventors present a method for blonde hair pixel removal in image skin colour detection. There, an rg-based skin colour model is used to detect skin pixels in digital images. They propose to separate correctly detected skin pixels from falsely detected blonde hair pixels based on their values in a 1D Hue space. More specifically, a pixel detected as skin by the initial chrominance-based skin colour model is retained as skin if its Hue value is less than 15°, otherwise it is rejected as hair. Nevertheless, experiments by the present inventor have shown that this approach is detrimental to the skin detection process as can be seen in FIG. 1. FIG. 1(a) shows the performance of an rg-based skin colour model in terms of FR (False Rejection; the skin pixels which were falsely rejected) and FA (False Acceptance; the hair pixels that were falsely accepted) as a function of the skin colour probability threshold θ ranging from 1 (the minimum value) to 255 (the maximum value). FIG. 1(b) shows the same statistics after the incorporation of the method proposed by Chen and Ray as a post-processing step, as suggested by the inventors. The skin colour model was created from data which encompass various Caucasians skin tones under various illuminations. The data used in this evaluation encompass various Caucasian/Asian/African/etc. skin tones under various illuminations and various Caucasian/Asian/African/etc. hair tones under various illuminations. This is a fair test since (i) chrominance-based skin colour models are meant to be robust to illumination intensity changes as well as to very different skin tones, arising from people of different ethnicities, and (ii) in an automatic skin detection system one does not generally know the exact skin tone, illumination conditions, hair colour, etc., of the subjects in the image. It can be seen that while the proposed method reduces the FA rate (the maximum FA drops from ~76.34% in FIG. 1(a) to ~22.34% in FIG. 1(b)), it has a detrimental effect on the FR rate (the minimum FR increases from ~3.16% in FIG. 1(a) to ~43.97% in FIG. 1(b)). Clearly, significant improvement is desirable both in terms of further suppressing false hair pixel detection as well as in terms of minimising the rejection of valid skin pixels as a result of this hair removal process.

The present invention addresses the problem of false hair detection during the process of skin detection in digital images or video sequences.

The invention addresses the problem of severe FR degradation (i.e. incorrectly rejecting valid skin pixels) in the process of FA suppression (i.e. while trying to eliminate hair pixels) as observed for the skin/hair separation method of Chen and Ray. The proposed method is extremely successful in eliminating hair pixels with a minimal degradation in terms of falsely eliminating valid skin pixels.

In contrast to the method proposed by Chen and Ray, the invention allows the skin/hair separation process to be customised on an application-specific, image-specific or even image-region-specific basis, so that desirable classification error costs and prior probabilities of occurrence may be reflected. With the proposed method, how mild or aggressive the method is in eliminating hair pixels can be defined, which has an effect on its success in retaining skin pixels.

In contrast to the method proposed by Fleck et al., the invention does not need to rely on texture information, which can be unreliable under different image scales and also entails an increased computational load.

Aspects of the invention are set out in the accompanying claims.

In a preferred embodiment, the invention is used for distinguishing skin from hair. Given a skin detection process X which is very successful in detecting skin but is weak in that it also detects hair, features of the embodiment are as follows:

A skin colour model Y1 and a hair colour model Y2 are created. Preferably, the hair model is created for the hair that confuses the initial skin detection process; not for any and all hair colours. The colour space is chosen for the models so that each model is (a) successful in detecting its respective material, (b) largely insensitive to the material of the other model and (c) it is not important how it behaves to other materials. This last part (c) is important, because without it may be impossible to satisfy both (a) and (b); this is the problem that the initial detection process X has to begin with. For example, Y1 should be good in detecting skin, insensitive to hair, and it does not matter if it also detects other materials, e.g. wood, sand, etc. Similarly for Y2. Given a pixel that is detected as skin by the initial detection process X, it is examined by the models Y1 and Y2 which assign probabilities $p_{Y1}$ and $p_{Y2}$ to it. These probabilities are compared to decide whether it is skin or hair. Weight factors for the probabilities can be introduced in order to create a system, for example, that will eliminate some hair but have skin retention as its priority, or try to eliminate all the hair regardless of how this affects skin detection, etc. The reason it does not matter how Y1 and Y2 react to materials other than skin and hair is that such materials will be rejected by the initial filter X. If X has other "weakness", e.g. skin/wood confusion, the process can be repeated, i.e. by creating models Z1 and Z2 for skin and wood in some colour space, which might even be the same colour space as for Y1 and Y2, and so on.

In general terms, an embodiment of the invention can be expressed as follows. Given a method which is very successful in not falsely rejecting a material A but also suffers false acceptances, grouping said false acceptances into one or more groups B, C, D and so on, identifying colour spaces which resolve the confusion between A and at least one other group, creating models in said colour spaces, using said models in a multiple classifier configuration which eliminates said false acceptances with minimal effects on the good detection properties of the initial method, said multiple classifier configuration being parameterisable to reflect desirable classification error costs and prior probabilities of occurrence.

In the above, grouping could mean conceptual grouping, as we have done here, e.g. hair is one group, wood is another group and so on. Grouping can also be a more formal process. For example, in the colour space of the initial detection process, perform clustering to automatically determine groups. This could result in blonde hair and sand becoming one group, dark hair and wood becoming another group and so on.

Embodiments of the invention will be described with reference to the accompanying drawings of which:

Figure 1:
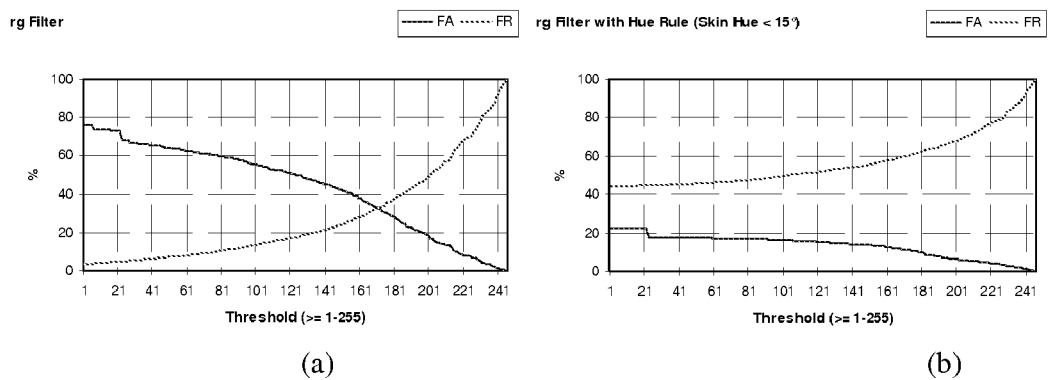
FIGS. 1a and 1b are graphs illustrating false acceptance and false rejection in the prior art.
Figure 2:
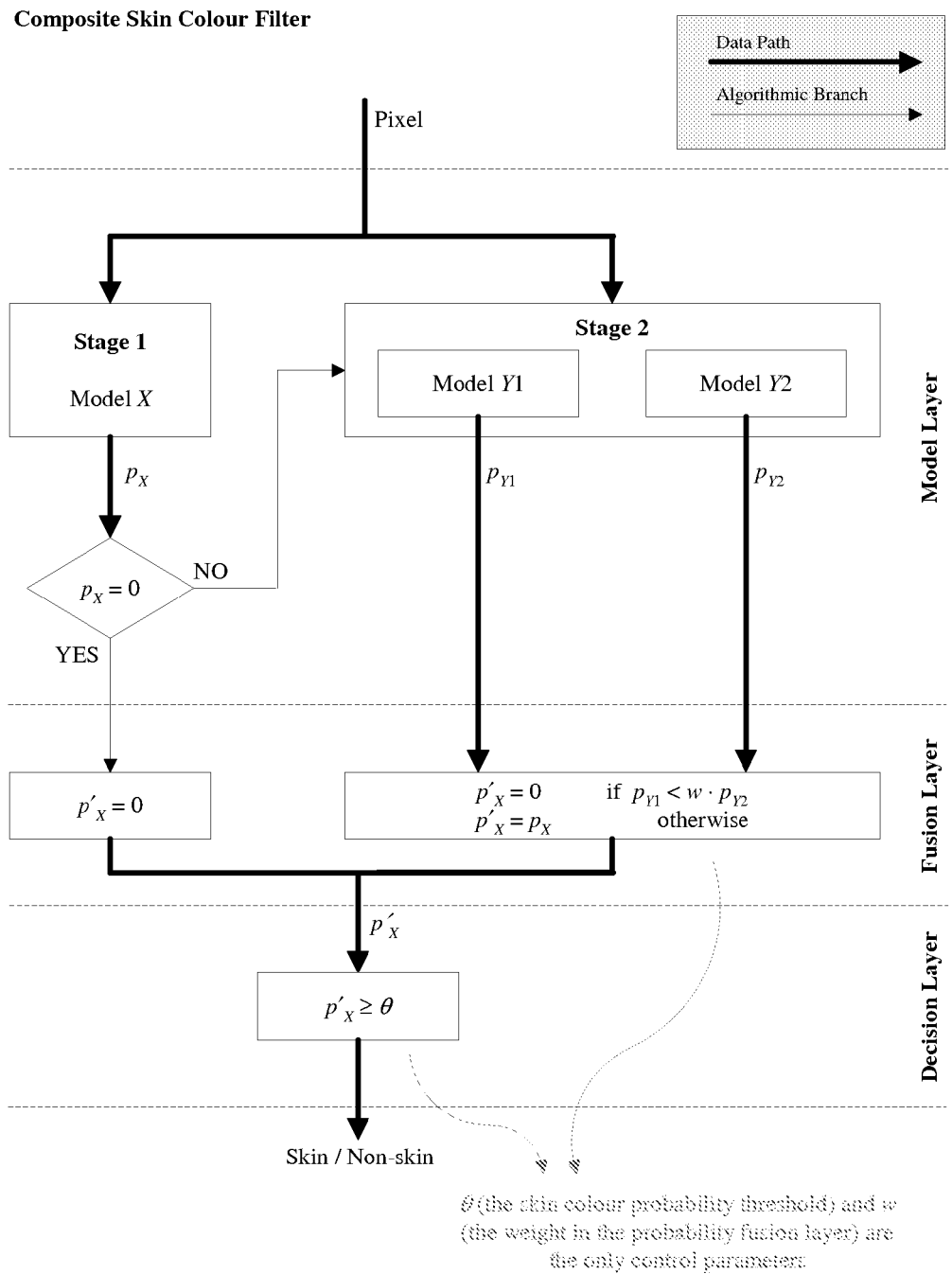
FIG. 2 is a block diagram illustrating an embodiment of the invention.

FIG. 2 shows one embodiment of the invention. Given a database of skin pixels, a skin colour model X is created as a statistical histogram-based model in the 2D $C_bC_r$ chrominance space. In simple terms, all the skin pixels in the database are converted to the $C_b C_r$ space and plotted onto a histogram. These new colour coordinates are derived from RGB using $$C_b = -0.169 \times R - 0.331 \times G + 0.500 \times B$$

$$C_r = +0.500 \times R - 0.419 \times G - 0.081 \times B$$

This histogram is then normalized to some maximum value. Because the results of skin filtering are commonly inspected and demonstrated visually, it is common to normalise the histogram in the integer range [0 . . . 255], as is also the case in this specific embodiment. Also, the histogram has $256^2$ bins in this specific embodiment, but can be generalised to any bin size.

A 2D colour space which is good for skin/hair separation has been identified. The first dimension is the B plane of the original RGB representation. This is directly linked to the intensity information. The second dimension is the difference R-G of the original RGB representation, scaled and shifted so that it has the same range as the B plane. This is invariant to additive illumination intensity changes (brightness). The inventor has not found the combination of these two components in a single representation system, so the resultant colour representation system will be referred to as (B, R-G).

The skin colour model Y1 is created from the same database used for the creation of X and is a statistical histogram-based model in the (B, R-G) space. For the hair colour model Y2, a hair pixel database is used. This database is first filtered by the skin model X. The hair pixels which are given a non-zero probability by X are used for the creation of the hair colour model Y2, which also takes the form of a statistical histogram-based model in (B, R-G). As for X, in this embodiment the Y1 and Y2 histograms also have $256^2$ bins, but can be generalised to different bin sizes.

FIG. 2 shows one possible combination of the filters X, Y1 and Y2 in a single "composite" or "multiple classifier" filter.

A digital image is input to the system, and each pixel is examined individually. The colour value for a pixel is expressed in terms of a particular colour space, and this value is transferred into $C_b C_r$ space for input to Stage 1 as shown in FIG. 2 and into the (B, R-G) space for input to Stage 2 as shown in FIG. 2.

The value of the pixel in the relevant colour space is compared with the histogram model derived using the databases as explained above to determine a probability, as described below.

1. In the process of skin detection, each pixel in a digital image is assigned a skin colour probability value $p_X$ by Stage 1 of the composite filter, i.e. the model X.
2. If $p_X \neq 0$ then
    a. Stage 2 is activated to examine the pixel in question. In Stage 2, the pixel is assigned probabilities $p_{Y1}$ and $p_{Y2}$ by the models $Y_1$ and $Y_2$ respectively.
    b. In the Fusion Layer, the new skin colour probability $p'_X$ is calculated. More specifically, if $p_{Y1} < w \cdot p_{Y2}$ then $p'_X = 0$. Otherwise $p'_X = p_X$.
3. If $p_X = 0$ then in the Fusion Layer $p'_X = 0$.
4. In the Decision Layer, the final skin colour probability $p'_X$ is examined in conjunction with a threshold $\theta$ and a classification decision is reached.

Implicit in this definition is the fact that if $p_{Y1} = p_{Y2} = 0$ then the original skin colour probability is not modified. In simple terms, if the second filtering stage cannot offer an opinion, it is disregarded and the output of the first stage holds. The weight w can be adjusted to reflect desired classification error costs and prior probabilities. For example, setting w<1 will result in an increasingly milder hair removal process, with negligible or non-existent adverse effects for the correctly detected skin pixels. In a similar manner, setting w>1 will result in an increasingly more aggressive hair removal process. Thus, the embodiment can provide accurate and adjustable selective elimination. The value w can be fixed for an application implementation but differ between different applications, or it can be variable at the image level, or it can even be variable at the sub-image level. With regards to the latter, for example, a connected component analysis algorithm can identify skin regions based on the output of the first filter X and then each skin region can be refined using the hair separation filter.

Figure 3:
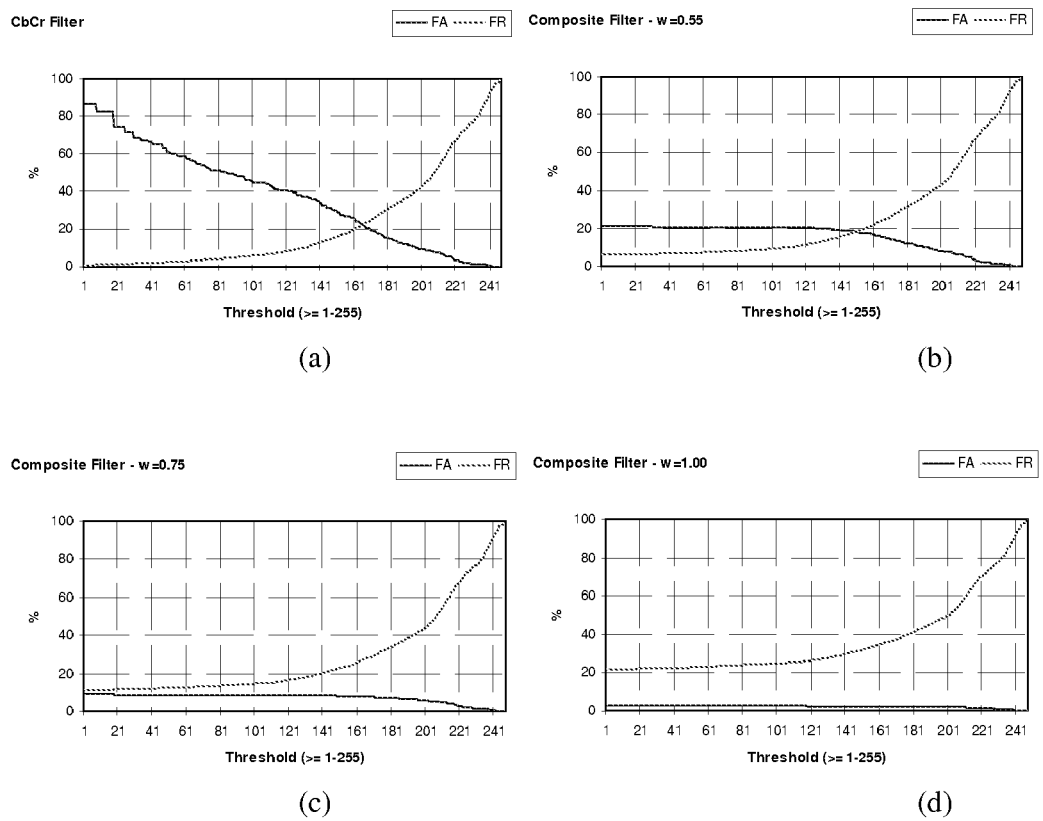
FIGS. 3a to 3d are graphs illustrating false acceptance and false rejection for an embodiment of the invention with different weight values.
Figure 4:
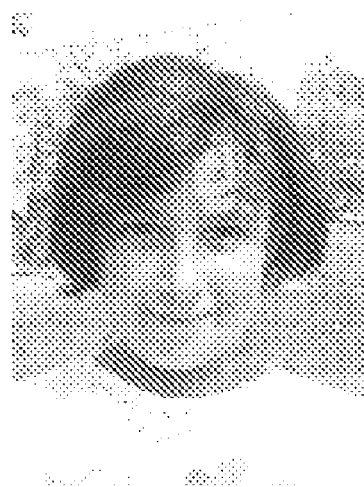
FIGS. 4 and 5 are examples of images at different stages of processing using a method according to an embodiment of the invention.
Figure 4:
Figure 4:
Figure 5:
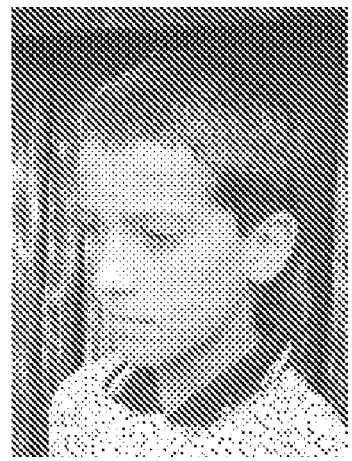
Figure 5:
Figure 5:
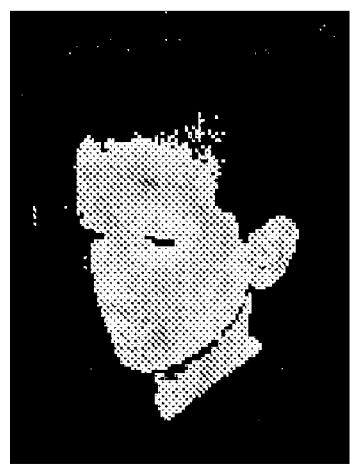
Figure 6:
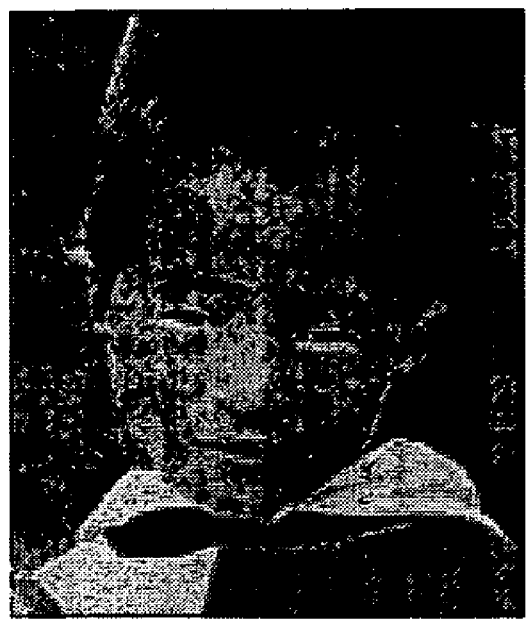
Figure 6:
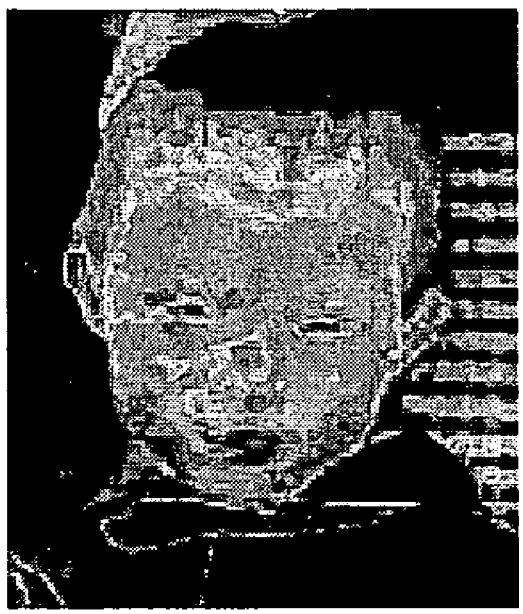
Figure 6:
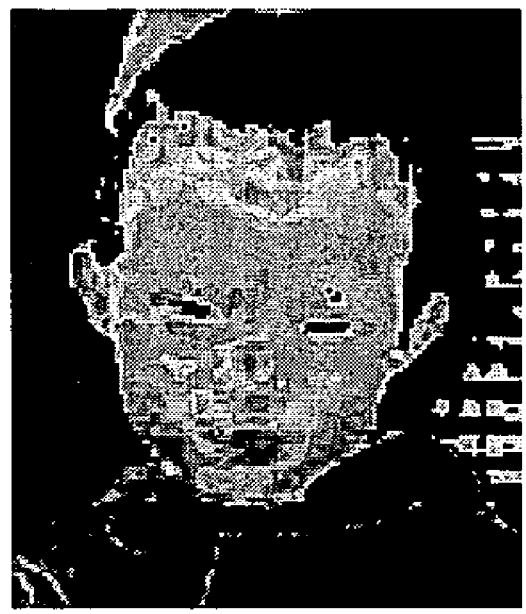
Figure 7:
Figure 7:
Figure 7:
Figure 8:
Figure 8:
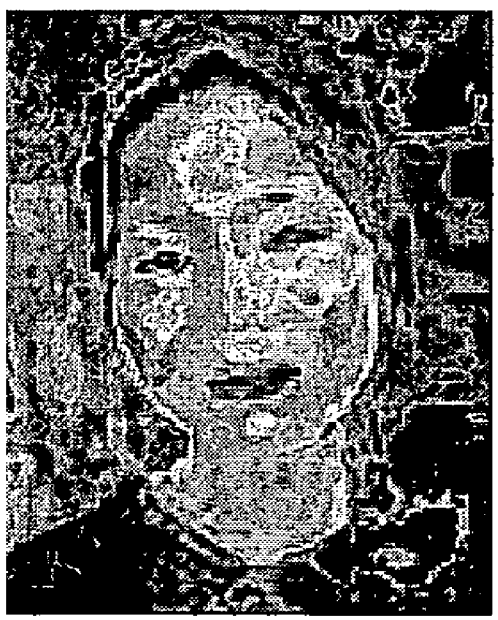
Figure 8:
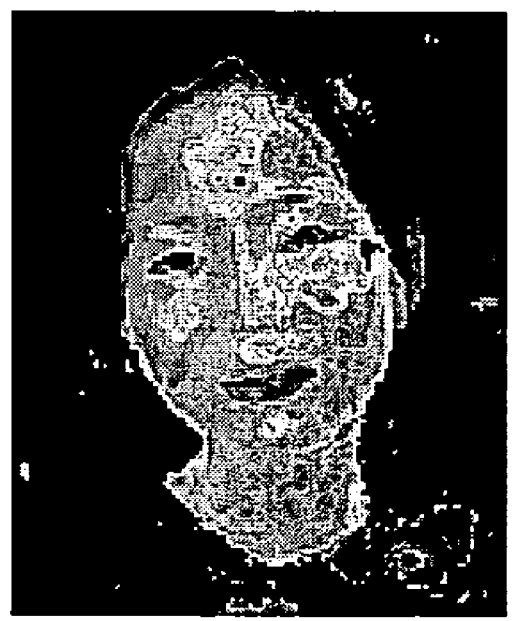
Figure 9:
Figure 9:
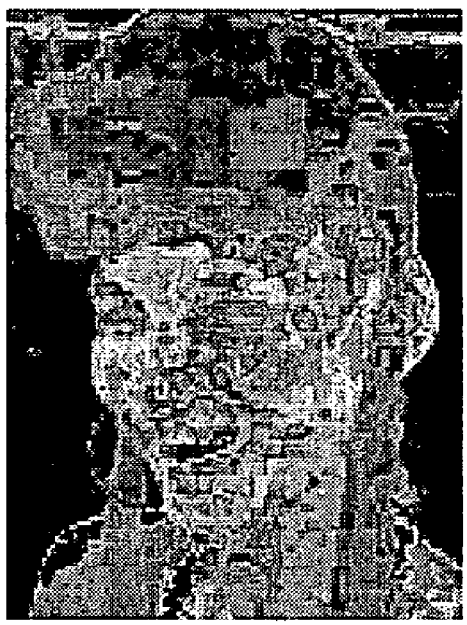
Figure 9:

FIG. 3 illustrates the performance of the proposed method. More specifically, as a baseline, FIG. 3(a) shows the performance of the model X on its own in terms of FR (False Rejection; the skin pixels which were falsely rejected) and FA (False Acceptance; the hair pixels that were falsely accepted) as a function of the skin colour probability threshold $\theta$ ranging from 1 (the minimum value) to 255 (the maximum value). The skin colour model X was created from data which encompass various Caucasians skin tones under various illuminations. The data used in this evaluation encompass various Caucasian/Asian/African skin tones under various illuminations and various Caucasian/Asian/African/etc. hair tones under various illuminations. As mentioned earlier, this is a fair test since (i) chrominance-based skin colour models are meant to be robust to illumination intensity changes as well as to very different skin tones, arising from people of different ethnicities, and (ii) in an automatic skin detection system one does not generally know the exact skin tone, illumination conditions, hair colour, etc., of the subjects in the image. For the composite filter, the skin colour model Y1 was created using the same data as for X. The hair colour model Y2 was constructed from a database of various Caucasians hair tones under various illuminations after it was filtered by the model X whereby only the hair pixels with a non-zero skin colour probability were retained. FIGS. 3(b), (c) and (d) show the same statistics on the same evaluation data for the composite filter with weights w of 0.55, 0.75 and 1.00 respectively. It can be seen that the composite filters achieve a remarkable suppression of the false hair detection with minimal effects on the false skin rejection. The customizability of the filter in terms of its "aggressiveness" in eliminating falsely detected hair is also clearly illustrated by the different FA and FR curves for the different values of the weight w. FIGS. 4 and 5 show some pictorial examples. FIG. 4a is the original image, FIG. 4b shows the stage 1 output, and FIG. 4c shows the composite filter output. In this example, w=0.80. Similarly, FIG. 5a is the original image, FIG. 5b shows the stage 1 output and FIG. 5c shows the composite filter output (w=0.75). Note that the composite filter also eliminates non-skin and non-hair regions which were detected as skin by Stage 1.

Examples of variations on and alternatives to the above embodiment are described below.

With the embodiment presented here, for each pixel a classification is made based on the probabilities delivered by the models. Alternative implementations can apply various spatial filtering techniques on these probabilities, such as median or mean, or on the pixels of the original image. Such extensions are within the scope of the invention.

Where probabilities are used, these can be discreet, having two or more values or continuous.

In alternative implementations the model X can theoretically be of any type and in any colour space of any dimensionality and of any information content, and can involve any colour-based techniques (histogram-based, Gaussian, etc.), or non-colour techniques such as texture based techniques, or a combination thereof. The same applies to the models Y, which are not necessarily limited to colour-based techniques.

The B v. R-G colour space is one colour space which has good properties in separating skin from hair. Other spaces, for example (R, G-B) and/or other colour space dimensions and/or other information content, for example a colour space which directly contains intensity such as (I, R-G) can be used. Also, although histogram-based models are used here, the invention does not specify what type the models $Y_1$ and $Y_2$ should adhere to. Different implementations, but still within the scope of the invention, can assume different types for the models $Y_1$ and $Y_2$ (e.g. Gaussian).

With the embodiment described here, the new probability for a pixel will be either the old probability or zero. However, alternative implementations may derive the new probability from an arbitrary function of one or more or all of the probabilities which are input to the function.

Having found a colour representation system where one material is separable from another, e.g. (B, R-G) for separating skin from hair, it is not necessary to create models for both materials. For example, an alternative implementation to the one of FIG. 2 could employ only the model $Y_1$ or the model $Y_2$ in conjunction with a threshold. Although our experimentation shows that this degrades the performance of the composite filter, it is a viable alternative with decreased associated computational complexity. Also, having calculated the models $Y_1$ and $Y_2$, in an alternative implementation one could fuse the models themselves (e.g. weighted subtraction of the models along the lines of the probability fusion of FIG. 2) and then use a single fused model.

The filter X of FIG. 2 can itself be a composite filter as shown in FIG. 2. For example, in a new composite filter, Stage 1 might be some means which is very successful in not falsely rejecting skin but suffers from certain specific types of false acceptances, and subsequent stages address each of these false acceptances. Thus, Stage 2 eliminates the falsely detected hair as described earlier, Stage 3 eliminates falsely detected wood, Stage 4 eliminates falsely detected sand and so on until the fusion layer.

FIG. 2 presents a serial topology in that Stage 2 is only activated if Stage 1 produces a non-zero probability. In a parallel topology, both Stage 1 and Stage 2 could always operate for each pixel and, given the appropriate function in the Fusion Layer, the output of Stage 2 could modify the output of Stage 1 even when the latter is zero. For multiple materials as described above, hybrid topologies can also be explored.

Examples of applications of the invention include mobile videophones with face tracking (see, for example, our co-pending application no. EP-A-1 353 516) or in surveillance systems, such as for detecting and/or tracking people, video conferencing and similar.

The invention can be implemented for example in a computer system, with suitable software and/or hardware modifications. Aspects of the invention can be provided in software and/or hardware form, or in an application-specific apparatus or application-specific modules can be provided, such as chips.

Although a preferred colour space system is suggested for some features of the invention, any suitable colour spaces can be used, preferably chosen for the desired content extraction.

The invention claimed is:

1. A method of classifying pixels in an image, the method comprising combining (a) a method of identifying pixels of a first content type, wherein said method may also falsely identify pixels of a second content type as belonging to said first content type, with (b) a method of distinguishing between pixels of types including said first content type and pixels of types including said second content type, wherein method (b) comprises (c) a method for distinguishing between said first content type and content including said second content type and/or (d) a method for distinguishing between said second content type and content including said first content type.

2. A method as claimed in claim 1 wherein one or more of methods (a), (c) and (d) involve models representing the relevant content types, for example, histograms models.

3. A method as claimed in claim 2 comprising deriving a model for one or more content types using known examples of the content types, for example, by deriving a histogram.

4. A method as claimed in claim 1 comprising using the results of method (a) to determine whether or not to use one or both of methods (c) and (d).

5. A method as claimed in claim 1 involving combining the results of method (a) with the results of one or both of methods (c) and (d).

6. A method as claimed in claim 1, wherein the result produced by each of methods (c) and (d) for a pixel is a probability measure that a pixel does or does not belong to a given content type, where said probability measure ranges over at least two values.

7. A method as claimed in claim 6, wherein at least one of the methods (c) and (d) entails a spatial filtering of the probability values it produces, said spatial filtering involving the modification of the probability value for a pixel based on the probability values of neighbouring pixels in an arbitrary neighborhood, for example, in a processes of spatial smoothing.

8. A method as claimed in claim 6 wherein the results produced by method (a) are modified by the probability values produced by one or both of methods (c) and (d).

9. A method as claimed in claim 8 comprising comparing for a pixel the probability value produced by method (c) with the probability value produced by method (d), where the outcome of the comparison is used to modify the results produced by method (a).

10. A method as claimed in claim 9 wherein at least one of said probability values of methods (c) and (d) is weighted, where each weight is independent from the other.

11. A method as claimed in claim 10 wherein the weighting value is variable and/or specified by a user of the method.

12. A method as claimed in claim 6 wherein, for a pixel, the result produced by method (a) is modified according to the rule (I) If $w_{y1} \cdot p_{y1} \geq w_{y2} \cdot p_{y2}$ then accept the result of method (a)

(II) If $w_{y1} \cdot p_{y1} < w_{y2} \cdot p_{y2}$ then reject the result of method (a)

where $p_{y1}$ and $p_{y2}$ are the probability values produced by methods (c) and (d) respectively, and $w_{y1}$ and $w_{y2}$ are the weights applied to $p_{y1}$ and $p_{y2}$ respectively.

13. A method as claimed in claim 1, wherein the result produced by each of methods (a), (c) and (d) for a pixel is a probability measure that a pixel does or does not belong to a given content type, where said probability measure ranges over at least two values.

14. A method as claimed claim 13, wherein at least one of the methods (a), (c) and (d) entails a spatial filtering of the probability values it produces, said spatial filtering involving the modification of the probability value for a pixel based on the probability values of neighbouring pixels in an arbitrary neighborhood, for example, in a processes of spatial smoothing.

15. A method as claimed in claim 13 wherein the probability values produced by method (a) are modified by the probability values produced by one or both of methods (c) and (d).

16. A method as claimed in claim 15 comprising comparing for a pixel the probability value produced by method (c) with the probability value produced by method (d), where the outcome of the comparison is used to modify the probability value produced by method (a).

17. A method as claimed in claim 16 wherein at least one of said probability values of methods (c) and (d) is weighted, where each weight is independent from the other.

18. A method as claimed in claim 17 wherein the weighting value is variable and/or specified by a user of the method.

19. A method as claimed in claim 13 wherein, for a pixel, the probability value $p_X$ produced by method (a) is modified to become $p'_X$ according to the rule (I) If $p_X \neq 0$ then
  (i) $p'_X = 0$ if $w_{y1} \cdot p_{y1} < w_{y2} \cdot p_{y2}$
  (ii) $p'_X = p_X$ if $w_{y1} \cdot p_{y1} \geq w_{y2} \cdot p_{y2}$
(II) If $p_X = 0$ then $p'_X = 0$ where $p_{y1}$ and $p_{y2}$ are the probability values produced by methods (c) and (d) respectively, and $w_{y1}$ and $w_{y2}$ are the weights applied to $p_{y1}$ and $p_{y2}$ respectively.

20. A method as claimed in claim 1 comprising deriving a value reflecting the probability that a pixel is of the first content type, and wherein said probability value is compared with a threshold to arrive at a decision.

21. A method as claimed in claim 20 wherein the threshold is variable and/or specified by a user of the method.

22. A method as claimed in claim 1 wherein one or more of methods (a), (c) and (d) involve use of colour for the representation of content types.

23. A method as claimed in claim 22 wherein a pixel is transformed into a different colour space for at least one of methods (a), (c) and (d).

24. A method as claimed in claim 22 wherein method (a) uses a different colour space from one or both of methods (c) and (d).

25. A method as claimed in claim 22 wherein methods (c) and (d) use the same colour space.

26. A method as claimed in claim 22 wherein methods (c) and (d) use a colour space with dimensionality equal to or greater than two.

27. A method as claimed in claim 22 comprising converting the input value into a colour space which is substantially invariant to illumination variations, for example, the 2D $C_bC_r$ space.

28. A method as claimed in claim 22 comprising converting the input value into a colour space which is partly invariant to illumination variations, for example, the 2D (B, R-G) space, where R, G and B represent components of an RGB representation.

29. A method as claimed in claim 22 where method (a) involves a non-colour feature such as texture.

30. A method as claimed in claim 1 wherein the first content type is skin.

31. A method as claimed in claim 1 wherein the second content type is hair or wood or the like.

32. A method as claimed in claim 1 wherein method (a) is in itself a method according to claim 1, for example, for the detection of a first content type and elimination of a falsely detected second content type, third content type and so on.

33. A method of detecting skin using a method as claimed in claim 1.

34. Method or apparatus arranged to use, encode, transmit, receive or decode data derived using a method as claimed in claim 1.

35. Apparatus arranged to execute a method as claimed in claim 1.

36. Apparatus as claimed in claim 35 which is a computer system.

37. A computer program stored in a computer-readable medium for executing a method as claimed in claim 1.

38. Computer-readable storage medium storing a computer program as claimed in claim 37.

* * * * *